2,951,009
Patented Aug. 30, 1960

2,951,009
STABLE AQUEOUS SUSPENSION OF PIPERAZINE-CARBON DISULFIDE COMPLEX

Erik H. Jensen, Kalamazoo Township, Kalamazoo County, Mich., assignor to The Upjohn Company, Kalamazoo, Mich., a corporation of Michigan No Drawing. Filed Feb. 28, 1958, Ser. No. 718,151

12 Claims. (Cl. 167—53)

This invention relates to a veterinary therapeutic composition and more particularly to an aqueous suspension containing piperazine-carbon disulfide molecular complex.

Although piperazine-carbon disulfide molecular complex is known in solid dosage forms, its veterinary use in these forms has not been uniformly efficacious. For example, its use in the expulsion of bots from horses has generally been unsuccessful unless accompanied by the heroic measure of orally administering hydrochloric acid.

Aqueous preparations of the piperazine-carbon disulfide complex for oral administration have heretofore been unsatisfactory because of chemical and physical instability under some conditions, and ineffectiveness and undersirable side reactions under other conditions. For example, under some conditions a solution of the piperazine-carbon disulfide complex can prematurely hydrolyze the complex yielding free carbon disulfide. The latter compound is considered unsatisfactory for use per se, as frequently causing pain, colic, and anorexia. Under other conditions a solution of the complex can exert adverse effects on the oral and gastrointestinal mucous membranes. Desquamation of mucous surfaces and similar unfavorable manifestations can occur. Moreover, under still other conditions, dissociation of the complex to the active components in the stomach is hindered, making the product ineffective. An additional problem for an aqueous suspension is crystal growth and aggregation which can cause sedimentation, caking and failure to resuspend homogeneously. In avoiding all of these problems, the pH range of about six to about nine has unexpectedly been found to be critical.

It is an object therefore of the present invention to provide a stable aqueous suspension of the piperazine-carbon disulfide molecular complex. A further object is to provide such a suspension which is an effective anthelmintic and boticide. A still further object is to provide such an aqueous suspension which dissociates readily to the active components after oral administration. A still further object is to provide such a suspension which is free from deleterious crystal growth and aggregation. Other objects will be apparent to those skilled in the art to which this invention pertains.

The foregoing and additional objects have been accomplished by the provision of an aqueous suspension comprising piperazine-carbon disulfide unimolecular complex, a primary suspending agent, a primary surfactant, and a buffer system which maintains the pH between about six and about nine. Glyceryl monostearate is the preferred primary suspending agent. Other fatty acid esters of glycerin can be used provided that the content of pure glyceryl monostearate is at least thirty percent by weight. Secondary suspending agents include methylcellulose and sodium carboxymethylcellulose. Polyoxyl 40 stearate having the formula

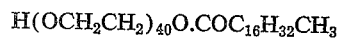

is the preferred primary surfactant. Other useful polyoxyl stearates are those with degrees of polymerization of the polyoxyethylene moiety of from thirty to fifty. Secondary surfactants include sorbitan monopalmitate, sorbitan monostearate, sorbitan monooleate, mixtures thereof, and the like which have a Hydrophile-Lipophile Balance Index of below seven. It is preferred to use a buffer system consisting of citric acid and sodium phosphate. However, other compatible, non-toxic buffering systems maintaining the critical pH range of from about six to nine can be utilized.

The piperazine-disulfide complex is the equimolecular compound of piperazine and carbon disulfide having the empirical formula $C_5H_{10}N_2S_2$. The preparation of this compound has been described by Schmidt and Wichmann: Berichte 24, 3243 (1891); Herz: Berichte 30, 1585 (1897); and Pavolini and Gambarin: Ann. Chim. Applicata 39, 417 (1949). There is speculation by the various authors as to the precise structure of the complex.

The types and amounts of the principal active ingredients and of the supplementary and complementary ingredients can be varied to suit the particular dosage requirements and the physical compatibilities required. The content of the piperazine-carbon disulfide complex can be varied from about five percent to about 33.0 percent weight/volume with about 25.0 percent preferred. The content of the monostearate ester of the condensation polymer can vary from about 0.05 percent to about 0.5 percent weight/volume with about 0.1 percent preferred. The content of glyceryl monostearate can vary from about 0.2 percent to about one percent weight/volume with about 0.5 percent preferred.

The basic method of preparation of the composition of the invention is to disperse glyceryl monostearate in water with the aid of the polyoxyl stearate and then add the piperazine-carbon disulfide complex. The piperazine-carbon disulfide complex is in a form suitable for aqueous suspensions such as the micronized and microprecipitated forms, and mixtures of milled and micronized material. A particle size of 99 percent less than 20 microns can be used. However, a particle size of 99 percent less than 10 microns is preferred. It is preferred to use heat in the dispersion of the glyceryl monostearte, but other methods known in the art can be utilized.

Additional active ingredients can be added to the composition of the invention to complement the action of the piperazine-carbon disulfide complex. Thus, other anthelmintics and boticides can be utilized, for example, arecoline hydrobromide, phenothiazine, lead arsenate, cadmium compounds, nicotine sulfate, copper sulfate, ascaridol, hexylresorcinol, alpha-phenetylpyridine, alpha-propylpyridine, and the like, or mixtures thereof. Antibiotics can be utilized with advantageous results, for example, hygromycin, puromycin, neomycin, bacitracin, and the like, or mixtures thereof. Advantageously, laxatives can be combined in the suspension, as well as sulfa drugs, especially those which are water-insoluble. Complementary vitamin treatment, especially with vitamins of the B Complex and $B_{12}$, can be utilized.

Supplementary ingredients and adjuvants can be added to the suspensions of this invention. Viscosity-increasing agents such as sorbitol and gums such as tragacanth and acacia; as well as alginates and carrageentes, can be utilized. It is desirable to include preservatives such as methylparaben, propylparaben, butylparaben, sodium benzoate, sorbic acid, and the like, or mixtures thereof.

Compositions stabilized in suspension form by the ingredients, buffer system and methods of the instant invention do not show deleterious crystal growth and the insoluble phase does not sediment and cake under storage and handling conditions. Said compositions provide the active ingredient in a form readily dissociable after oral administration as an anthelmintic and boticide.

The following examples are illustrative of the composition of the invention but are not to be construed as limiting.

*Example 1—Stable aqueous suspension of piperazine-carbon disulfide complex*

One hundred gallons of an aqueous suspension is prepared from the following types and amounts of ingredients:

| | |
|---|---|
| Polyoxyl 40 stearate USP | 13 oz. 154 grs. |
| Glyceryl monostearate NF | 4 lbs. 3 oz. |
| Sorbitan monooleate | 6 oz. 296 grs. |
| Sodium phosphate exsiccated NF | 13 oz. 154 grs. |
| Citric acid hydrate Po. USP | 2 oz. 60 grs. |
| Methylparaben USP | 13 oz. 154 grs. |
| Propylparaben USP | 6 oz. 296 grs. |
| Methylcellulose USP, 25 centipoises, micronized | 3 lbs. 5 oz. 179 grs. |
| Piperazine - carbondisulfide micronized (flushed 5%) | 219 lbs. |
| Sorbitol solution NF | 40 gals. |
| Deionized water | q.s. |

Directions: Heat 25 gallons of deionized water to 85°–90° centigrade. Dissolve the polyoxyl 40 stearate, glyceryl monostearate, sorbitan monooleate, sodium phosphate, citric acid, methylparaben and propylparaben in the hot water with stirring. Cool to about 40° centigrade with stirring and add a dispersion of the methylcellulose and the micronized piperazine-carbondisulfide in the sorbitol solution. Stir the mixture until it reaches room temperature, then add q.s. deionized water to 100 gallons. Pass through suitable dispersing equipment.

*Example 2*

Following the procedure of Example 1, an aqueous suspension is prepared from the following types and amounts of materials:

[Each milliliter contains]

| | | |
|---|---|---|
| Polyoxyl 40 stearate USP | mg | 0.05 |
| Glyceryl monostearate NF | mg | 2.0 |
| Sorbitan monooleate | mg | 0.5 |
| Sodium phosphate exsiccated NF | mg | 1.0 |
| Citric acid hydrate Po. USP | mg | 0.16 |
| Methylparaben USP | mg | 1.0 |
| Propylparaben USP | mg | 0.5 |
| Methylcellulose USP, 25 centipoises, micronized | mg | 4.0 |
| Piperazine - carbondisulfide micronized (flushed 5%) | mg | 52.5 |
| Sorbitol solution NF | ml | 0.4 |
| Deionized water | | q.s. |

By the addition of 125 milligrams of micronized phenothiazine per milliliter, an aqueous suspension containing five percent of the piperazine-carbondisulfide complex and 12.5 percent of phenothiazine is obtained.

*Example 3*

Following the procedure of Example 1, an aqueous suspension is prepared from the following types and amounts of ingredients:

[Each milliliter contains]

| | | |
|---|---|---|
| Polyoxyl 40 stearate USP | mg | 5.0 |
| Glyceryl monostearate NF | mg | 10.0 |
| Sorbitan monooleate | mg | 0.5 |
| Sodium phosphate exsiccated NF | mg | 1.0 |
| Citric acid hydrate Po. USP | mg | 0.16 |
| Methylparaben USP | mg | 1.0 |
| Propylparaben USP | mg | 0.5 |
| Methylcellulose USP, 25 centipoises, micronized | mg | 4.0 |
| Piperazine-carbondisulfide micronized (flushed 5%) | mg | 346.5 |
| Sorbitol solution NF | ml | 0.4 |
| Deionized water | | q.s. |

A dry admixture is prepared by substituting powdered d-sorbitol crystals or powdered sucrose for the sorbitol solution in the above example. Such a dry admixture forms a stable suspension when added to water.

The suspension of the invention provides a convenient liquid for oral administration to remove gastrointestinal parasites from animals, for example, horses, sheep, swine and poultry.

For the removal of ascarids and small strongyles from horses, a dose providing about one-half ounce of the 25 percent suspension per 100 pounds of body weight is preferred. For pinworms, bots and large strongyles, about one ounce is preferred. The suspension can be administered with a stomach tube or a dose syringe. Parasites will be eliminated beginning about eighteen hours after treatment and most of them will appear in the feces within 48 hours. Six times the therapeutic dose is required to elicit toxic manifestations.

Feeder pigs, gilts, sows and boars can be treated with the suspension of the invention. The preferred dose is about one ounce of the 25 percent suspension per 130 pounds of body weight. Such a dose is effective in removing large roundworms, nodular worms and stomach worms. Ten times the recommended dose has produced no untoward reactions in swine. Oral administration can be by dose syringe or stomach tube. However, dilution in drinking water is a satisfactory mode of administration.

For nodular worms of sheep a dose of about one ounce of the 25 percent suspension per sheep is preferred, increasing to about one and one-half ounces for common stomach worms. The mode of administration should be by dose syringe or stomach tube. In the case of common stomach worms preliminary mouth swabbing with a ten percent solution of copper sulfate is advisable. The therapeutic ratio is wide, as three times the recommended dose has been given to sheep without toxic effects.

Poultry can be treated to remove large roundworms, the dosage in the drinking water varying from two-thirds ounce of 25 percent suspension for each forty birds under twelve weeks to one ounce of 25 percent suspension for each forty adult birds.

Table I contains data on the use of the suspension of the invention in eighteen horses. Both preworming and postworming microscopic egg counts of strongyle parasites are recorded. The sodium nitrate fecal flotation method was used in egg counting. It should be noted that the preworming egg counts are per field, whereas the postworming egg counts are per slide. +1 means that more than one microscopic field had at least one egg present. +2 means that at least two eggs per field were found in more than one field. +3 means that at least three eggs per field were found in more than one field. +4 means that four or more eggs were found per field in more than one field.

TABLE I

| Horse No. | Age (Years) | Weight (Lbs.) | Pretreatment Egg Count Per Micro Field | Suspension Dose, cc. | Posttreatment Egg Count Per Slide | Toxicity Noted |
|---|---|---|---|---|---|---|
| 1 | 19 | 1,050 | +4 | 300 | 1 egg per slide | none. |
| 2 | 21 | 1,100 | +1 | 325 | negative | Do. |
| 3 | 19 | 1,150 | +3 | 340 | do | Do. |
| 4 | 19 | 1,050 | +3 | 300 | 2 eggs per slide | Do. |
| 5 | 12 | 1,000 | +4 | 300 | 1 egg per slide | Do. |
| 6 | 19 | 1,025 | +4 | 300 | do | Do. |
| 7 | 18 | 1,150 | +4 | 340 | negative | Do. |
| 8 | 17 | 1,275 | +4 | 375 | 2 eggs per slide | Do. |
| 9 | 21 | 1,000 | +4 | 300 | 1 egg per slide | Do. |
| 10 | 12 | 1,100 | +4 | 325 | 4 eggs per slide | Do. |
| 11 | 21 | 1,050 | +4 | 325 | 1 egg per slide | Do. |
| 12 | 12 | 950 | +2 | 300 | negative | Do. |
| 13 | 21 | 1,150 | +2 | 340 | 1 egg per slide | Do. |
| 14 | 16 | 1,300 | +4 | 375 | 2 eggs per slide | Do. |
| 15 | 22 | 1,200 | +4 | 350 | negative | Do. |
| 16 | 22 | 1,000 | +1 | 300 | do | Do. |
| 17 | 19 | 1,100 | +4 | 325 | 1 egg per slide | Do. |
| 18 | 16 | 1,400 | +4 | 400 | do | Do. |

These data show that the over-all strongyle egg count dropped to a very low level, most slides being negative or containing only one or two eggs.

Table II contains a summary of parasite recovery in feces of foals after oral administration of the suspension of the invention.

TABLE II
SUMMARY OF PARASITES RECOVERED IN FECES FOLLOWING ANTHELMINTIC TREATMENT

| Suspension Dosage | No. of Foals | Range and Aver. Age in Days at Treatment | Parascaris | Strongyles | Oxyuris | Total Bot Larvae | Parasite Recovery |
|---|---|---|---|---|---|---|---|
| 0.6 ml./kg | 14 | 26–126; 96 | 292 / 20.9 | 680 / 48.6 | 159 / 11.4 | 62 / 4.4 | total. / mean. |
| 0.4 ml./kg | 14 | 39–124; 99 | 309 / 22 | 1,280 / 91.4 | 80 / 5.7 | 49 / 3.5 | total. / mean. |
| 0.3 ml./kg | 14 | 33–142; 103 | 266 / 19 | 440 / 31.4 | 160 / 11.4 | 79 / 5.6 | total. / mean. |
| 0.2 ml./kg | 4 | 62–147; 113 | 164 / 41 | 535 / 133.7 | 31 / 3.9 | 48 / 12 | total. / mean. |
| Controls | 5 | 48–128; 99 | 0 | 0 | 0 | 0 | total. |

These data show the marked effect of the suspension in removing parasites including the normally resistant bots. The removal of bots was unexpected in view of the fact that bots are normally removed only by the accompanying oral administration of acid.

It is to be understood that the invention is not to be limited to the exact details of operation or exact compositions shown and described herein as obvious modifications and equivalents will be apparent to one skilled in the art, and the invention is therefore to be limited only by the scope of the appended claims.

I claim:

1. A stable aqueous suspension comprising piperazine-carbon disulfide unimolecular complex, a fatty acid ester of glycerine containing at least about thirty percent by weight of glyceryl monostearate, a primary surfactant and a compatible buffer system which maintains the pH between about six and about nine.

2. A stable aqueous suspension comprising piperazine-carbon disulfide unimolecular complex, glyceryl monostearate, a monostearate of a condensation polymer of the formula $H(OCH_2CH_2)_nOH$ wherein $n$ is a positive integer from thirty to fifty, and a citric acid-sodium phosphate buffer system which maintains the pH of from about six to nine.

3. A stable aqueous suspension comprising from about five to about 33 percent weight/volume of piperazine-carbon disulfide unimolecular complex, from about 0.2 to about one percent weight/volume of glyceryl monostearate, from about 0.05 to about 0.5 percent weight/volume of a monostearate of a condensation polymer of the formula $H(OCH_2CH_2)_nOH$ wherein $n$ is a positive integer from thirty to fifty and a citric acid-sodium phosphate buffer system which maintains the pH between about six and about nine.

4. A stable aqueous suspension comprising about 25 percent weight/volume of piperazine-carbon disulfide unimolecular complex, about 0.5 percent weight/volume of glyceryl monostearate, about 0.1 percent weight/volume of polyoxyethylene 40 monostearate, and a citric acid-sodium phosphate buffer system which maintains the pH between about six and about nine.

5. A stable aqueous suspension comprising piperazine-carbon disulfide unimolecular complex, a comptable buffer system which maintains the pH between about six and about nine, a suspending agent and a surfactant.

6. A method of removing gastrointestinal parasites which comprises the oral administration to horses of from about one-half ounce to one ounce, per 100 pounds of horse weight, of a stable aqueous suspension comprising from about five to about 33 percent weight/volume of piperazine-carbon disulfide unimolecular complex, a fatty acid ester of glycerine containing at least about thirty percent by weight of glyceryl monostearate and a primary surfactant, stabilized at a pH of from about six to about nine.

7. A method of removing gastrointestinal parasites which comprises the oral administration to swine of about one ounce, per 130 pounds of swine weight, of a stable aqueous suspension comprising from about five to about 33 percent weight/volume of piperazine-carbon disulfide unimolecular complex, a fatty acid ester of glycerine containing at least about thirty percent by weight of glyceryl monostearate and a primary surfactant, stabilized at a pH of from about six to about nine.

8. A method of removing gastrointestinal parasites which comprises the oral administration to sheep of from about one ounce to about one and one-half ounces, per sheep, of a stable aqueous suspension comprising from about five to about 33 percent weight/volume of piperazine-carbon disulfide unimolecular complex, a fatty acid ester of glycerine containing at least about thirty percent by weight of glyceryl monostearate and a primary surfactant, stabilized at a pH of from about six to about nine.

9. A method of removing gastrointestinal parasites which comprises the oral administration to fowl of from about two-thirds to one ounce, per forty fowl, of a stable aqueous suspension comprising from about five to about 33 percent weight/volume of piperazine-carbon disulfide unimolecular complex, a fatty acid ester of glycerine containing at least about thirty percent by weight of glyceryl monostearate and a primary surfactant, stabilized at a pH of from about six to about nine.

10. A method of removing gastrointestinal parasites which comprises the oral administration to animals of a stable aqueous suspension comprising piperazine-carbon disulfide unimolecular complex, a compatible buffer system which maintains the pH between about six and about nine, a suspending agent and a surfactant.

11. A method of removing gastrointestinal parasites which comprises the oral administration to animals of a stable, aqueous suspension comprising piperazine-carbon disulfide unimolecular complex, a fatty acid ester of glycerine containing at least about thirty percent by weight of glyceryl monostearate, a primary surfactant and a compatible buffer system which maintains the pH between about six and about nine.

12. A stable aqueous suspension comprising piperazine-carbon disulfide unimolecular complex, a compatible buffer system which maintains the pH between about 6 and about 9, a suspending agent, a surfactant and phenothiazine.

References Cited in the file of this patent
UNITED STATES PATENTS
2,814,583    Leiper _____ Nov. 26, 1957